US006998067B2

(12) United States Patent
Tsutsumi et al.

(10) Patent No.: US 6,998,067 B2
(45) Date of Patent: Feb. 14, 2006

(54) METHOD OF DUSTING-PREVENTIVE TREATMENT OF POWDER HAVING DUSTING PROPERTY

(76) Inventors: Hirofumi Tsutsumi, c/o ASO Co., Chuokenkyusho, 2468 Nakaburu, Kasuyacho, Kasuya-Gun, Fukuoka (JP) 811-2304; Teruo Urano, 775-3 Ishizukacho, Tochigi, Sano City (JP) 327-0103; Masatsune Ogura, 16-11, Arai 1-Chome, Ichikawa-City, Chiba (JP) 272-0144; Tetsuya Shimoda, 1397-3 Hatsuzawacho, Hachioji-City, Tokyo (JP) 193-0845

( * ) Notice: Subject to any disclaimer, the term of this patent is extended or adjusted under 35 U.S.C. 154(b) by 0 days.

(21) Appl. No.: 10/703,638

(22) Filed: Nov. 10, 2003

(65) Prior Publication Data

US 2004/0245495 A1  Dec. 9, 2004

Related U.S. Application Data

(63) Continuation of application No. 10/370,498, filed on Feb. 24, 2003, now abandoned, which is a continuation of application No. PCT/JP01/05700, filed on Jul. 2, 2001.

(30) Foreign Application Priority Data

Aug. 23, 2000 (JP) ............................. 2000-251989

(51) Int. Cl.
*C09K 3/22* (2006.01)

(52) U.S. Cl. ................... 252/88.1; 252/88.2; 427/212; 427/221; 106/400

(58) Field of Classification Search ............... 252/88.1; 427/212, 221
See application file for complete search history.

(56) References Cited

U.S. PATENT DOCUMENTS

| 3,993,584 | A | * | 11/1976 | Owen et al. ................ 252/383 |
| 5,480,584 | A | * | 1/1996 | Urano et al. ................ 252/384 |
| 5,788,879 | A | * | 8/1998 | Ogura et al. ............... 252/88.1 |
| 6,464,776 | B1 | * | 10/2002 | Tsutsumi et al. ........... 106/802 |

* cited by examiner

*Primary Examiner*—Necholus Ogden
(74) *Attorney, Agent, or Firm*—Sughrue Mion, PLLC

(57) ABSTRACT

A method of dusting-preventive treatment in which a powder having dusting property is treated with fibril-forming PTFE (polytetrafluoroethylene) to impart non-dusting property thereto and the non-dusting property of the powder, after having been reduced during transportation, are economically and advantageously recovered or improved through a relatively simple step. The method comprises: a first dusting-preventive treatment step in which fibril-forming polytetrafluoroethylene is added to a powder having dusting property, and a compression/shear force is exerted to the mixture at a temperature in the range of 20 to 200° C. to thereby regulate powder so as to have a flow value of 150 mm to 200 mm; and a second dusting-preventive treatment step in which a compression/shear force is exerted again at a temperature in the range of 50 to 150° C., without newly adding fibril-forming polytetrafluoroethylene, to the resultant powder after the powder treated in the first step has deteriorated in dusting-preventive property during transportation with transporting means due to such an external force that the polytetrafluoroethylene fibrils partly cleave or powder particles partly fall off polytetrafluoroethylene fibril nets.

5 Claims, 2 Drawing Sheets

US 6,998,067 B2

METHOD OF DUSTING-PREVENTIVE TREATMENT OF POWDER HAVING DUSTING PROPERTY

CROSS REFERENCE

This is a Continuation of application Ser. No. 10/370,498, filed on Feb. 24, 2003 now abandoned, which is a Continuation of PCT Application No. JP01/05700 filed Jul. 2, 2001. This application is based on Japanese Patent Application No. 2000-251989 filed Aug. 23, 2000, the contents of which are incorporated herein by reference.

TECHNICAL FIELD

The present invention relates to a method of dusting-preventive treatment of powder such as cement that tends to scatter dust upon handling or during transportation or storage.

BACKGROUND ART

As a technique for prevention of dusting of powder such as cement that tends to scatter dust upon handling or during transportation or storage, a method of adding a fibril-forming polytetrafluoroethylene (hereinafter polytetrafluoroethylene is simply referred to as PTFE) to the powder having dusting property, stirring them to exert compression/shear force so as to form PTFE fibril from fibril-forming PTFE thereby suppressing dusting has been developed.

The dusting-preventive treating technique described above is disclosed, for example, in Japanese Published Examined Patent Application No. 24872/1993 (JP-H05-24872 B4). When a fibril-forming PTFE is added to a cement powder and fibril-forming treatment of exerting compression/shear force is applied by using the technique disclosed in this patent publication, since the cement powder is in a state of being covered and agglomerated in cobweb-like nets of PTFE fibrils, a dusting-preventive cement with no scattering of cement powder in atmospheric air can be obtained.

Further, Japanese Published Examined Patent Application No. 32877/1977 (JP-S52-32877-B4) discloses a technique of mixing a fibril-forming PTFE with a powdery material and exerting compression/shear force to the mixture at a temperature in the range of 20 to 200° C., thereby forming PTFE fibril and suppressing dusting of the powdery material.

As described above, occurrence of dusts can be prevented by applying the dusting-preventive treatment to the cement powder or the like based on the technique as disclosed in Japanese Published Examined Patent Application No. 24872/1993 and Japanese Published Examined Patent Application No. 32877/1977.

The methods of preventing dusting by the nets of the PTFE fibrils described above involve a drawback in that strong air pressure, suction force or shearing force exerts on the dusting-preventive powdery product when it is transported under pressure or transported under suction by a pneumatic transportation apparatus used generally for powder transportation or when transported at a high speed by a screw conveyor or a rotary feeder at high speed rotation as a powder transportation method, the PTFE fibrils is partially broken or a portion of powdery particles is detached from the nets of the PTFE fibrils to remarkably lower the dusting-preventive performance. Accordingly, in the transportation step of the dusting-preventive powder products in a production site has a problem that it is inevitable to use a transportation machine not exerting strong external force to the product such as a belt conveyor and transportation of the product undergoes restriction to some extent in view of the apparatus and in view of the quantity. In addition, even when the dust-forming powder deteriorated with the dusting-preventive performance is stirred at a temperature of 20 to 200° C. again to exert compression/shear force, the dusting-preventive performance can not be recovered. Accordingly, for the recovery of the dusting-preventive performance, it is necessary for again adding an appropriate amount of fibril-forming PTFE and stirring them at a temperature in the range of 20 to 200° C. to exert compression/shear force.

A subject intended to be solved in accordance with this invention is to provide a dusting-preventive treating method capable of advantageously recovering or improving the dusting-preventive performance of the dust-forming powder whose dusting-preventive performance has been lowered during transportation, by a relatively simple step and with economical advantages.

DISCLOSURE OF THE INVENTION

A method of dusting-preventive treatment of powder having dusting property according to the present invention comprises: a first dusting-preventive treatment step in which fibril-forming polytetrafluoroethylene is added to a powder having dusting property, and a compression/shear force is exerted to the mixture at a temperature in the range of 20 to 200° C. to thereby regulate powder so as to have a flow value of 150 mm to 200 mm; and a second dusting-preventive treatment step in which a compression/shear force is exerted again at a temperature in the range of 50 to 150° C., without newly adding fibril-forming polytetrafluoroethylene, to the resultant powder after the powder treated in the first step has deteriorated in the dusting-preventive performance during transportation with transporting means due to such an external force that the polytetrafluoroethylene fibrils partly cleave or powder particles partly fall off the polytetrafluoroethylene fibril nets.

BEST MODE FOR CARRYING OUT THE INVENTION

Figure 2:
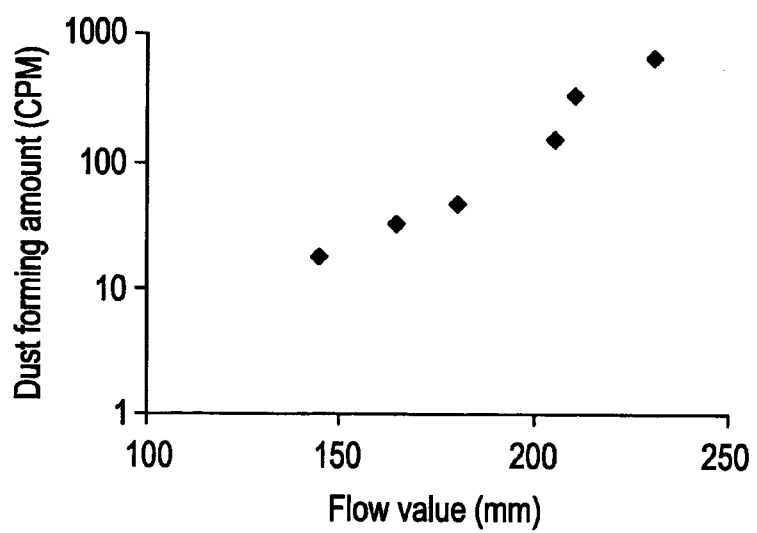
FIG. 2 is a graph showing a relation between the flow value and a dusting-preventive performance of a powder.

The flow value is an index that usually indicates the softness of mortar and the measuring method is provided in JIS R5201. In this invention, the flow value measured by the same method for the cement put to a dusting-preventive treatment is adopted as an index that indicates the degree of fibrillation of PTFE. In the measuring method, a flow cone having 100 mm lower inner diameter, 70 mm upper inner diameter and 60 mm height is set at the center of a flow table of 300 mm diameter and a specimen is filled inside of the flow cone. After removing the flow cone, the specimen is dropped together with the flow table from the height of 100 mm. This procedure is repeated by ten times (at a rate of once per one sec) and the diameter of the specimen after spreading is measured and defined as a flow value. As shown in FIG. 2, when the dusting amount of the powder is small and the dusting-preventive performance is high, the fluidity of the powder is low and the flow value decreases.

Figure 1:
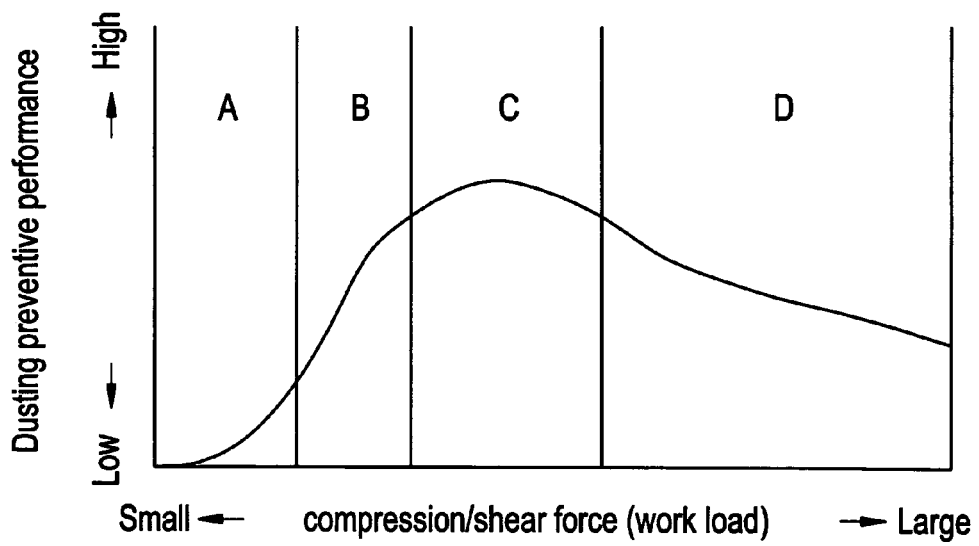
FIG. 1 is a graph showing a relation between compression/shear force (amount of work) in the dusting-preventive treatment and a dusting-preventive performance.

In the dusting-preventive treatment for the dust-forming powder by a fibril-forming PTFE, when the fibril-forming PTFE is added to the dust-forming powder, and compression/shear force is exerted at a temperature of 20 to 200° C., dispersion of the fibril-forming PTFE to the dust-forming powder and initial formation of fibrils from the fibril-forming PTFE particles occur at the initial stage. Then, fibrils develop rapidly and the dusting of the powder subsides rapidly into a plateau state. Then, when compression/shear force are further exerted, the dusting-preventive performance is lowered, finally, to reach a stage where re-dusting is observed. FIG. 1 shows the process schematically.

The particles of the fibril-forming PTFE are dispersed into the dust-forming powder at an appropriate temperature and fibrillated into fibrils under the compression/shear force as described above (region A in FIG. 1). When compression/shear force further exerts, fibrils grow and trap the dust-forming powder particles to improve the dusting-preventive performance (region B in FIG. 1). Growing of fibrils corresponds to increase of the aspect ratio of the fibril (fibril length/cross sectional area) by elongation of the fibril by the compression/shear force. When the fibril is elongated continuously as it is, its diameter is reduced excessively and the fibril is broken to loss the performance of trapping the dust-forming powder. With a micro point of view, not all fibril-forming PTFE particles cause fibrillation simultaneously but some particles start fibrillation just after the start of compression/shear force while other particles are fibrillated at a delay. Then, when compression/shear force continue further, breakage of fibrils formed previously and growing of fibrils occur concurrently. The equilibrium state between them is a plateau state (region C in FIG. 1). Then, when compression/shear force further exert continuously, breakage of fibrils becomes predominant and, finally, it reaches a stage where re-dusting is observed (region D in FIG. 1).

In the dusting-preventive treatment for the dust-forming powder by the fibril-forming PTFE, it is considered that the state of the region C shown in FIG. 1 provides a high dusting-preventive effect and economical advantage. However, in a case where the dusting-preventive performance is lowered under the effect of external force, for example, during transportation, the dusting-preventive performance can not be recovered even by stirring again at a temperature in the range of 20 to 200° C. and provision compression/shear force.

According to this invention, even when an external force exerts, for example, during transportation of dusting-preventive powder products to cause partial breakage of PTFE fibrils or to cause partial detachment of the powder particles from the nets of PTFE fibrils, the dust-forming powder can be made dusting-preventive by way of a second dusting-preventive treatment step of fibril-forming or re-fibril-forming of not yet fibrillated PTFE or partially fibrillated PTFE, which is mixed and dispersed in the dust-forming powder, with no further additional charge of PTFE. Further, upon production site transportation of powder products such as shipping or bulk loading on trucks, transportation and dusting-preventive treatment of applying compression/shear force can be exerted simultaneously, for example, by the use of a heating screw conveyor to provide an advantage of not requiring additional step for the dusting-preventive treatment.

PTFE used herein is a material that can be fibrillated, manufactured by emulsion polymerization as described in U.S. Pat. No. 2,559,752, for which either an emulsion type or powder type PTFE can be used.

Control for the flow value in the first dusting-preventive treatment step means control for the extent of fibrillation of PTFE, which is conducted generally by adjusting the compression/shear force to PTFE although details are different depending on the addition amount of PTFE, the kind of the dust-forming powder and the treatment temperature. Specifically, it can be attained by controlling the speed of stirring blades and the stirring time, for example, of a mixer.

In a case when the dusting-preventive treatment for the dust-forming powder by fibrillation of PTFE is conducted only for once, it is optimal to set the state near the plateau state (region C in FIG. 1) in view of the dusting-preventive effect and utilization efficiency of the fibril-forming PTFE and the flow value in this case is less than 150 mm, although different somewhat depending on the kind of the powder.

It is necessary that PTFE fibrils capable of recovering dusting-preventive performance in the second dusting-preventive treatment step after transported by a transportation apparatus such as a transportation machine should remain within a relatively small aspect ratio, which corresponds to the region B in FIG. 1. The flow value in this case is within a range from 150 mm to 200 mm. On the other hand, the treated product in the region A of FIG. 1 at the first dusting-preventive treatment step, that is, a treated product processed in a short stirring time where PTFE fibrils are not yet grown can not recover the dusting-preventive performance in the second dusting-preventive treatment step. Further, the product in the region C of FIG. 1, that is, a treated product for which the dusting-preventive effect by fibrillation of PTFE is in the plateau state or the treated product in the region D of FIG. 1, that is, a treated product in which PTFE fibrils are broken being processed for a long stirring time can neither recover the dusting-preventive performance by the second dusting-preventive treatment step.

The temperature condition for exerting compression/shear force in the second dusting-preventive treatment step is 50 to 150° C. According to the result of the test to be described later, no recovery or improvement in the dusting-preventive performance can be observed at a temperature lower than 50° C., whereas deterioration of the quality of the dust-forming powder such as false set of cement is observed at a temperature higher than 150° C.

The addition amount of PTFE in the first dusting-preventive treatment step is preferably from 0.01 to 0.5 parts by weight based on 100 parts by weight of the dust-forming powder. When the content of PTFE is less than 0.01 parts by weight, no sufficient dusting-preventive performance can be obtained. On the other hand, when it is more than 0.5 parts by weight, it results in a phenomenon that the dust-forming powder is set into a marshmallow-like state, in the first dusting-preventive treatment step. Further, identical or different kind of dust-forming powder may be added in the second dusting-preventive treatment step. In this case, it is preferred that PTFE is added somewhat in a great amount in the first dusting-preventive treatment step.

The method according to this invention is applicable to any of dust-forming powders and the most preferred are those powders to be produced in a great amount and transported by a great amount, for example, on ships, wagons or automobiles and they can include, for example, cement powder, hydrated lime powder, quicklime powder, calcium carbonate powder, slag powder, fly ash, talc and gypsum.

A preferred embodiment of this invention is to be described with reference to the drawings.

Figure 3:
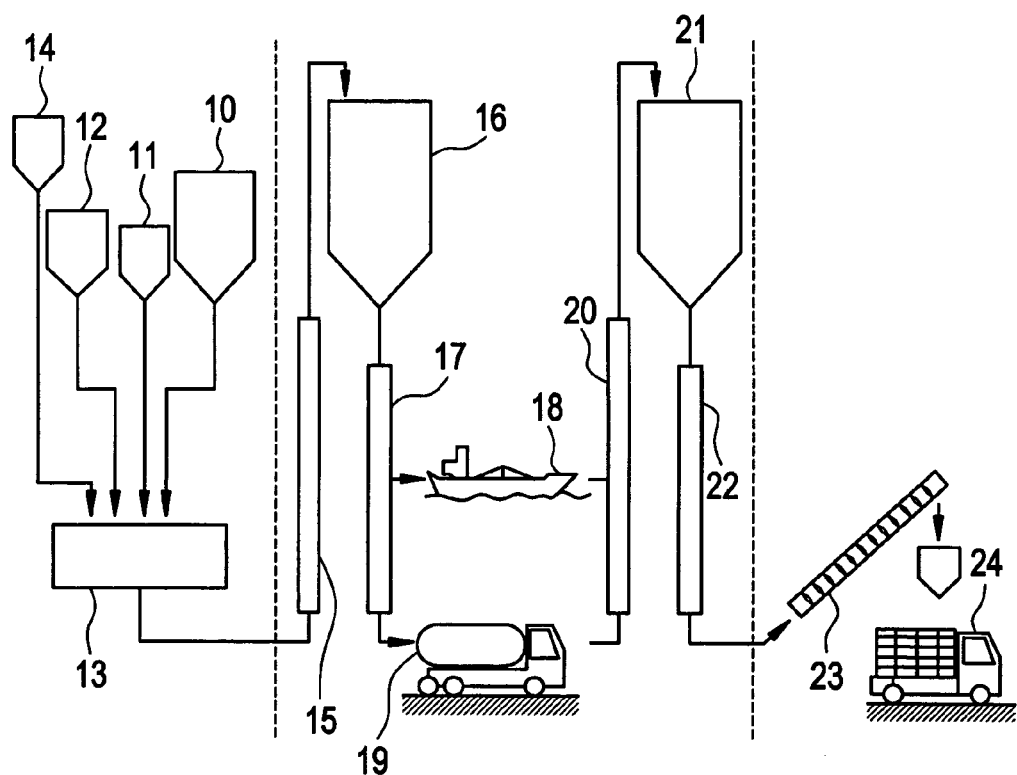
FIG. 3 is an explanatory view for the steps showing a dusting-preventive treating method of a preferred embodiment.

FIG. 3 is an explanatory step views of applying the dusting-preventive method according to this invention to portland cement produced in a cement plant.

In the production step for portland cement, clinker after baking is rapidly cooled with air, incorporated with additives such as gypsum and then pulverized in a finishing mill to control the grain size. Cement in a hopper 10 just after the processing has residual heat at about 100° C. When fibril-forming PTFE is added from a PTFE hopper 11 to the cement 10 at high temperature and compression/shear force are given by mixing and stirring using a mixer 13, fibrillation of PTFE proceeds and a great number of the cement particles are trapped in the nets of the fibrils of the partially fibrillated PTFE to obtain dusting-preventive cement.

The optimal amount of the fibril-forming PTFE added in this process depends on various conditions such as the dusting-preventive treating temperature, the structure of a mixer giving compression/shear force and the addition method. In this embodiment, 0.03 parts by weight of the fibril-forming PTFE is added based on 100 parts by weight of the cement.

In this embodiment, an emulsion type product under the commercial name of "Teflon (registered trademark) K-20" is used for the fibril-forming PTFE, but a powder type product under the commercial name of "Teflon (registered trademark) K-10" may also be used.

Further, cement having a residual heat at 100° C. is used in this embodiment, but for the cement product with lowered temperature, it may be adopted a method of adding quicklime in a hopper 14 and water in a hopper 12 to the mixer 13 and elevating the temperature by the heat of hydrating reaction, or a method of elevating the temperature by a heating device.

In this embodiment, compression/shear force are exerted by using the mixer 13 in the first dusting-preventive treatment step. Since the adaptability of the mixer is different depending on the kind of the cement powder, the form of PTFE, the method of temperature elevation and the amount of water added, it is preferred to select a mixer having a good fibril-forming efficiency, among pan type mixer, two axes pug mill type mixer, roller type mixer, for example, based on the result of a preliminary test. In a case where the roller type mixer is used, since the cement powder can efficiently undergo a composite effect of compression/shear and rolling between the roller and the bottom surface of the mixer, this is suitable to the dusting-preventive treatment of cement which is intended to reduce the addition amount of water as less as possible.

The dusting-preventive cement produced in the mixer 13 by the step described above is contained by way of a chain conveyor and bucket elevator 15 into a product silo 16 and then transported by way of a pressure transportation pipe 17 by pneumatic transportation and loaded on a cement tanker 18 or a cement transportation vehicle 19, and transported under bulk loading on the ship or the vehicle to a destination and then transported again through the pressure transportation pipe 20 by pneumatic transportation to a product silo 21 at a relay station.

Subsequently, the dusting-preventive cement is sent from the product silo 21 by way of a chain conveyor and a belt conveyor 22, exerted with compression/shear force under heating by a heating screw conveyor 23 as the second dusting-preventive treatment step to recover the dusting-preventive performance, and then transported in a state not packed as it is or packed each by a predetermined amount in a bag, and then transported by way of a cement transportation vehicle 24 to a destination. By pneumatic transportation and high speed transportation for several times in the course from the production of dusting-preventive cement to shipping of the products, PTFE fibrils are partially broken or a portion of powder particles is detached from the nets of the PTFE fibrils to bring about a phenomenon of remarkably lowering the dusting-preventive performance. However, since the PTFE contained in the dusting-preventive cement is re-fibrillated by heating and compression/shear force in the second dusting-preventive treatment step by the heating screw conveyor 23 before shipping, to trap the detached cement particles again by the nets of the fibrils, the dusting-preventive performance of the dusting-preventive cement is recovered or improved.

In this embodiment, description has been made to a case where dusting-preventive cement treated by the first dusting-preventive treatment step in a cement plant as a place of generating dust-forming powder is transported by way of a relay station, the products are sometimes transported directly under bulk loading from the place of production to a place of consumption of a large quantity, for example, a dam construction site. In such a case, the second dusting-preventive treatment may be conducted at the dam construction site as a place of use.

As described above, in this embodiment, the fibril-forming PTFE is added to a cement having residual heat at about 100° C. and compression/shear force are exerted in the first dusting-preventive treatment step in the mixer 13 to treat the dusting-preventive cement in which cement particles are trapped by the nets of the fibrils of the fibril-forming PTFE such that the flow value is within a range from 150 mm to 200 mm. Subsequently, while the dusting-preventive performance of the cement may sometimes be lowered during transportation by the external force given to the treated products during short range transportation, this embodiment can provide an effect of recovering or improving the dusting-preventive performance of the cement by heating and compression/shear force in the second dusting-preventive treatment step in the heating screw conveyor 23 which re-fibrillate the PTFE.

Further, this invention can provide another effect of recovering and improving the dusting-preventive performance of the dusting-preventive cement during transportation process with no additional charge of PTFE and with no additional provision of a dusting-preventive treatment facility. This means that the performance of the dusting-preventive cement can be recovered simply even in a construction site, for example, by merely attaching a heating device to the screw conveyor.

In this embodiment, description has been made to an example of applying the dusting-preventive treatment method according to this invention to the dust-forming cement but the invention is not restricted only thereto but is applicable generally also to other dust-forming powder.

COMPARATIVE EXAMPLE 1

While stirring cement having a residual heat at about 100° C. in the mixer 13 for applying the dusting-preventive treatment, a fibril-forming PTFE emulsion was added for treatment at a ratio of 0.03 parts by weight of PTFE solids based on 100 parts by weight of cement to form a dusting-preventive cement having a flow value of 150 mm, which was transported by the chain conveyor and the bucket elevator 15 and contained in the product silo 16 and then transported by pneumatic transportation by way of the pressure transportation pipe 17 to the cement transportation vehicle 19. Then, the products were re-transported again by pneumatic transportation from the cement transportation vehicle 19 by way of the pressure transportation pipe 20 to another product silo 21. Powder was sampled at five positions in this process and each dusting amount was measured by a digital powdery dust meter. The result of the measurement is shown in table 1.

TABLE 1

| Placement for measurement | Dusting amount (cpm) | Flow value (mm) |
|---|---|---|
| Cement in hopper 10 | 787 | 225 |
| Cement discharged from mixer 13 | 34 | 150 |
| Cement discharged from product silo 16 | 78 | 185 |
| Cement discharged from cement transportation vehicle 19 | 135 | 200 |
| Cement discharged from product silo 21 | 181 | 210 |

As can be seen from Table 1, the cement as dust-forming powder applied with the dusting-preventive treatment and decreased with the dust forming amount increases the dust forming amount by being put under transportation process such as a chain conveyor and pneumatic transportation to remarkably deteriorate the dusting-preventive performance of the dusting-preventive cement. This shows that the fibrils were partially broken or a portion of cement particles was detached from the nets of the PTFE fibrils.

Example 1

While stirring cement kept at a temperature of 80° C. by a roller type mixer having a heating and temperature keeping device, a fibril-forming PTFE emulsion was added for processing at a ratio of 0.03 parts by weight of PTFE solids based on 100 parts by weight of the cement, and the dusting-preventive performance was compared while varying the treating time. The result is shown in Table 2. For the evaluation of the dusting-preventive performance, the dusting amount was indicated as "AA" in a case of less than 50 cpm, as "BB" in a case of 50 to 150 cpm and as "CC" in a case of 150 cpm over.

TABLE 2

| Treating time (min) | Flow value (mm) | Dusting amount (cpm) | Dusting-preventive performance |
|---|---|---|---|
| 2 | 230 | 691 | CC |
| 3 | 200 | 149 | BB |
| 5 | 160 | 35 | AA |
| 7 | 145 | 18 | AA |
| 10 | 165 | 33 | AA |
| 13 | 180 | 48 | AA |
| 15 | 210 | 348 | CC |

The treating time of about 0 to 2 min corresponds to the region A, about 3 to 5 min corresponds to the region B and about 7 to 13 min corresponds to the region C and more treating time corresponds to the region D in FIG. 1.

When the temperature of the specimen for each of the treating times was lowered to a room temperature and external force was given to the PTFE fibrils by stirring for 10 min in a pan type forced pug mixer, fibrils were broken to form dust-forming powder. Subsequently, the specimen returned to the dust-forming powder was stirred while being kept at a temperature of 80° C. for 10 min to give compression/shear force by a roller type mixer having a heating and temperature keeping device and the dusting amount of each specimen was measured. The result is shown in Table 3.

TABLE 3

| First dusting-preventive treatment step | | Specimen undergoing | Second dusting-preventive treatment step | |
|---|---|---|---|---|
| Treatment time (min) | Dusting amount (CPM) | external force Dusting amount (CPM) | Dusting amount (CPM) | Dusting-preventive performance |
| 2 | 691 | 723 | 542 | CC |
| 3 | 149 | 715 | 47 | AA |
| 5 | 35 | 698 | 14 | AA |
| 7 | 18 | 736 | 616 | CC |
| 10 | 33 | 726 | 634 | CC |
| 13 | 48 | 709 | 663 | CC |
| 15 | 348 | 690 | 717 | CC |

As can be seen from Table 3, it was possible to recover the dusting-preventive performance by the second dusting-preventive treatment step only for the specimen treated in the first dusting-preventive treatment step such that the flow value was within a range from 150 mm to 200 mm, that is, only for the specimen put under the treatment for the time of 3 min and 5 min corresponding to the region B shown in FIG. 1.

Example 2

When a dusting-preventive cement having a flow value of 160 mm produced in Example 1 with the treatment time of 5 min in the first dusting-preventive treatment step was stirred for 10 min in a pan type forced pug mixer with the temperature being lowered to a room temperature to give external force to the PTFE fibrils, the fibrils were broken to form a dust-forming powder. Subsequently, the specimen returned to the dust-forming powder was stirred for 10 min in a roller type mixer having a heating and temperature keeping device as a second dusting-preventive treatment step to exert compression/shear force again, and the dusting amount for each specimen was measured. In this case, the heating temperature was set to 10° C., 20° C., 50° C., 75° C., 100° C., 150° C., 200° C. and 250° C., the dusting-preventive performance and false set of eight types of dusting-preventive cement treated at each temperature were investigated, and the result of the overall evaluation is shown in Table 4. The false set was expressed by the indentation of a Vicat probe as "AA" for less than 6 to 10 mm, as "BB" for 10 to 15 mm and as "CC" for 15 mm over, while the overall evaluation was expressed as "AA" for very much excellent, "BB" for excellent and "CC" for existent level.

TABLE 4

| Re-heating temperature (° C.) | Dusting-preventive performance | False set | Overall evaluation |
|---|---|---|---|
| 20 | CC | AA | CC |
| 50 | BB | AA | BB |
| 75 | AA | AA | AA |
| 100 | AA | AA | AA |
| 150 | AA | BB | BB |
| 200 | BB | CC | CC |

As can be seen from Table 4, in a case where the heating temperature was lower than 50° C., no recovery was observed for the dusting-preventive performance which was lowered after the dusting-preventive treatment. While false set of cement occurred in a case where the heating temperature is higher than 150° C. Thus, it has been confirmed that 50 to 150° C. is an optimal range for the treatment temperature in the second dusting-preventive treatment step to the cement applied with the first dusting-preventive treatment.

INDUSTRIAL APPLICABILITY

After the dusting-preventive treatment by the fibril-forming PTFE, the dusting-preventive performance of the dust-forming powder the dusting-preventive performance of which is lowered during transportation can be recovered or improved by a relatively simple step and with an economical advantage.

What is claimed is:

1. A method of dusting-preventive treatment of powder having dusting property comprising:
    a first dusting-preventive treatment step in which fibril-forming polytetrafluoroethylene is added to a powder having dusting property, and a compression/shear force is exerted to the mixture at a temperature in the range of 20 to 200° C. to thereby regulate powder so as to have a flow value of 150 mm to 200 mm;
    and a second dusting-preventive treatment step in which a compression/shear force is exerted again at a temperature in the range of 50 to 150° C., without newly adding fibril-forming polytetrafluoroethylene, to the resultant powder after the powder treated in the first step has deteriorated in dusting-preventive property during transportation with transporting means due to such an external force that the polytetrafluoroethylene fibrils partly cleave or powder particles partly fall off the polytetrafluoroethylene fibril nets.

2. The method according to claim 1, wherein said powder is selected from the group consisting of cement powder, hydrated lime powder, quicklime powder, calcium carbonate powder, slag powder, fly ash, talc and gypsum.

3. The method according to claim 1, wherein the addition amount of the fibril-forming polytetrafluoroethylene in the first dust preventive step is from 0.01 to 0.5 parts by weight based on 100 parts by weight of the powder.

4. The method according to claim 1, wherein the first dusting preventive treatment step is performed at a first location, and the regulated powder obtained in the first dusting-preventive treatment step is transported to a second location where it is subjected to the second dusting-preventive treatment step.

5. The method according to claim 4, wherein the regulated powder obtained in the first dusting-preventive treatment step is transported to one or more locations before it is transported to said second location.

* * * * *